(12) United States Patent
Gotou

(10) Patent No.: US 8,383,939 B2
(45) Date of Patent: Feb. 26, 2013

(54) STRUCTURE OF BUS BAR ASSEMBLY

(75) Inventor: Yukio Gotou, Chiryu (JP)

(73) Assignee: Denso Corporation, Kariya (JP)

( * ) Notice: Subject to any disclaimer, the term of this patent is extended or adjusted under 35 U.S.C. 154(b) by 249 days.

(21) Appl. No.: 12/911,992

(22) Filed: Oct. 26, 2010

(65) Prior Publication Data

US 2011/0127061 A1 Jun. 2, 2011

(30) Foreign Application Priority Data

Nov. 27, 2009 (JP) ................................. 2009-269800

(51) Int. Cl.
*H02G 5/00* (2006.01)
(52) U.S. Cl. ................... 174/68.2; 174/72 B; 174/71 B; 361/624; 361/611
(58) Field of Classification Search ................ 174/72 B, 174/71 B, 88 B, 70 B, 99 B, 129 B, 133 B, 174/149 B, 68.2; 361/600, 601, 624, 627, 361/637, 639, 648, 675, 641, 611; 439/212, 439/213, 114, 210
See application file for complete search history.

(56) References Cited

U.S. PATENT DOCUMENTS

| | | | | |
|---|---|---|---|---|
| 4,099,220 A | * | 7/1978 | Kovatch et al. | 174/68.2 |
| 4,266,091 A | * | 5/1981 | Fukuda | 174/72 B |
| 4,366,528 A | * | 12/1982 | Cole | 174/133 B |
| 5,057,650 A | | 10/1991 | Urushibara et al. | |
| 5,515,236 A | * | 5/1996 | Nolan et al. | 174/68.2 |
| 6,381,122 B2 | * | 4/2002 | Wagener | 174/71 B |
| 6,489,567 B2 | * | 12/2002 | Zachrai | 174/70 B |
| 6,934,147 B2 | * | 8/2005 | Miller et al. | 174/68.2 |

FOREIGN PATENT DOCUMENTS

| | | |
|---|---|---|
| JP | 2550919 | 6/1997 |
| JP | 11-098815 | 4/1999 |
| JP | 2007-215340 | 8/2007 |

OTHER PUBLICATIONS

Japanese Office Action dated Nov. 1, 2011, issued in counterpart Japanese Application No. 2009-969800 with English Translation.
Japanese Office Action dated Aug. 16, 2011, issued in corresponding Japanese Application No. 2009-269800 with English Translation.

* cited by examiner

*Primary Examiner* — Angel R Estrada
(74) *Attorney, Agent, or Firm* — Nixon & Vanderhye P.C.

(57) ABSTRACT

A bus bar assembly used for establish electric connections with semiconductor modules of an electric power converter. The bus bar assembly includes a resinous body, a first and a second bus bar to which terminals of the semiconductor modules are to be connected. Each of the first and second bus bars includes a plate body and a plurality of connecting terminals extending from the plate body substantially in parallel to a major surface of the plate body. At least a portion of the body plate of the first bus bar is disposed inside the resinous body. The second bus bar is mounted at the plate body on the resinous body and laid to overlap the first bus bar at a given distance away from the first bus bar. This structure minimizes the misalignment between the first and second bus bars after the resinous body is formed.

9 Claims, 8 Drawing Sheets

STRUCTURE OF BUS BAR ASSEMBLY

CROSS REFERENCE TO RELATED DOCUMENT

The present application claims the benefit of priority of Japanese Patent Application No. 2009-269800 filed on Nov. 27, 2009, the disclosure of which is incorporated herein by reference.

BACKGROUND OF THE INVENTION

1. Technical Field of the Invention

The present invention relates generally to a bus bar assembly equipped with a first and a second bus bar which are made of a flat strip and to which main electrode terminals of a plurality of semiconductor modules installed in an electric power converter are joined.

2. Background Art

Electric power converters such as inverters installed in electric vehicles or hybrid vehicles are usually equipped with a first and a second bus bar which are made of a flat strip and to which main electrode terminals of a plurality of semiconductor modules are coupled. For instance, the first bus bar is connected to a positive (+) electrode of a dc power supply. The second bus bar is connected to a negative (−) electrode of the dc power supply.

FIG. 8 illustrates a bus bar assembly 9, as taught in Japanese Patent First Publication No. 2007-215340. The bus bar assembly 9 includes a resin-molded body or case 93 in which the first bus bar 91 and the second bus bar 92 are disposed in parallel to each other. The molding of the first and second bus bars 91 and 92 with resin requires keeping the positional relation between them precisely. This is because electrical characteristics such as inductance of or resistance of insulation between the first and second bus bars 91 and 92 depend upon the positional relation between the first and second bus bars 91 and 92, thus requiring keeping the first and second bus bars 91 and 92 in a preselected positional relation within the case 93 at all times. When the first and second bus bars 91 and 92 are insert-molded with resin, the flow of the resin in a mold may result in misalignment between the first and second bus bars 91 and 92, thus requiring the need for holding the first and second bus bars 91 and 92 firmly in the mold. It is, however, difficult to keep the first and second bus bars 91 and 92 simultaneously in place in the mold, thus requiring a complicated structure of the mold to do so.

The covering of the first and second bus bars 91 and 92 with the resinous case 93 will result in a lack of dissipation of heat from the first and second bus bars 91 and 92, which leads to an undesirable rise in temperature of the bus bar assembly 9.

The complete covering of the first and second bus bars 91 and 92 will result in an increase in amount of resin material, which leads to an increase in entire production cost of the bus bar assembly 9.

The first and second bus bars 91 and 92 are, as illustrated in FIG. 9, disposed in the resinous case 93 with connecting terminals 911 and 921 thereof exposed outside the resinous case 93. This requires pieces of the mold to be drawn in four different directions K1, K2, K3, and K4 after resin material is solidified in the mold, thus resulting in a complicated structure of the mold.

SUMMARY OF THE INVENTION

It is therefore a principal object of the invention to avoid the disadvantages of the prior art.

It is another object of the invention to provide an improved structure of a bus bar assembly which is designed to keep the positional relation between a first and a second bus bar constant and have a good heat dissipation ability, and which may be manufactured in a simple manner and at a decreased cost.

According to one aspect of the invention, there is provided a bus bar assembly used for establish electric connections with a plurality of semiconductor modules of an electric power converter. The bus bar assembly comprises: (a) a resinous body; (b) a first bus bar to which electrode terminals of the semiconductor modules of the electric power converter are to be connected electrically; (c) a second bus bar to which electrode terminals of the semiconductor modules of the electric power converter are to be connected electrically. The first bus bar is made of a conductive plate which includes a plate body and a plurality of connecting terminals extending from the plate body substantially in parallel to a major surface of the plate body to establish the electric connections with the electrode terminals of the semiconductor modules. At least a portion of the body plate of the first bus bar is disposed inside the resinous body. Similarly, the second bus bar is made of a conductive plate which includes a plate body and a plurality of connecting terminals extending from the plate body substantially in parallel to a major surface of the plate body to establish electric connections with the electrode terminals of the semiconductor modules. The second bus bar is mounted at the plate body on the resinous body and laid to overlap the first bus bar at a given distance away from the first bus bar.

For example, the first bus bar is insert-molded with the resinous body, while the second bus bar is not insert-molded, thus eliminating the need for retaining both the first and second bus bars in the mold when the resinous body is formed. This minimizes the misalignment between the first and second bus bars in the bus bar assembly. The desired positional relation between the first and second bus bars is, therefore, established only by holding the first bus bar in place within the mold.

The bus bar assembly may be designed to be built up by insert-molding the first bus bar with the resinous body and then joining the second bus bar to the resinous body, thus facilitating the ease of completing the resinous body. In other words, the resinous body is easy to mold by using only two molding blocks and complete by drawing the molding blocks in opposite directions.

The second bus bar is not disposed inside the resinous body, thus permitting one of major surfaces thereof exposed to the air as a whole, thus enhancing the dissipation of heat from the bus bar assembly.

Only the first bus bar may be insert-molded with the resinous body, thus resulting in a decrease in material used to mold the resinous body, which leads to a decrease in overall production cost of the bus bar assembly.

As described above, the bus bar assembly is designed to ensure the positional relation between the first and second bus bars, have increased ability of heat dissipation, and be manufactured in a simple way at low costs.

In the preferred mode of the invention, the resinous body has formed therein a front opening through which a portion of a front surface of the plate body of the first bus bar is exposed outside the resinous body and a back opening through which a portion of a back surface of the plate body of the first bus bar is exposed outside the resinous body. The front and back openings are aligned in a thickness-wise direction of the resinous body. The resinous body also has formed thereon a boss extending from a major surface of the resinous body around the front opening. The second bus bar has a positioning opening in which the boss is fit to fix a positional relation of the second bus bar relative to the resinous body.

The first bus bar has a hole formed to extend through the portions of the front surface and the back surface of the plate body of the first bus bar exposed through the front and back openings. The hole is smaller in diameter than the front and back openings. When the resinous body is formed, the first bus bar may be nipped at the front and back surfaces thereof through the small-diameter hole by, for example, protrusions formed on the molding blocks.

The resinous body may also have formed therein a second front opening through which a portion of the front surface of the plate body of the first bus bar is exposed outside the resinous body and a second back opening through which a portion of the back surface of the plate body of the first bus bar is exposed outside the resinous body. The second front and back openings are aligned in the thickness-wise direction of the resinous body. The resinous body also has formed thereon a second boss extending from the major surface of the resinous body around the second front opening. The second bus bar has a second positioning opening in which the second boss is fit to fix the positional relation of the second bus bar relative to the resinous body. This further ensures the stability in orientation of the second bus bar to the resinous body (i.e., the first bus bar).

The boss extends above a thickness of the second bus bar. The formation of the front opening results in concern about a decrease in resistance of insulation between the first and second bus bars, but however, the boss lengthens the creepage distance between the first and second bus bars, thereby ensuring the desired resistance of insulation between the first and second bus bars.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 5:
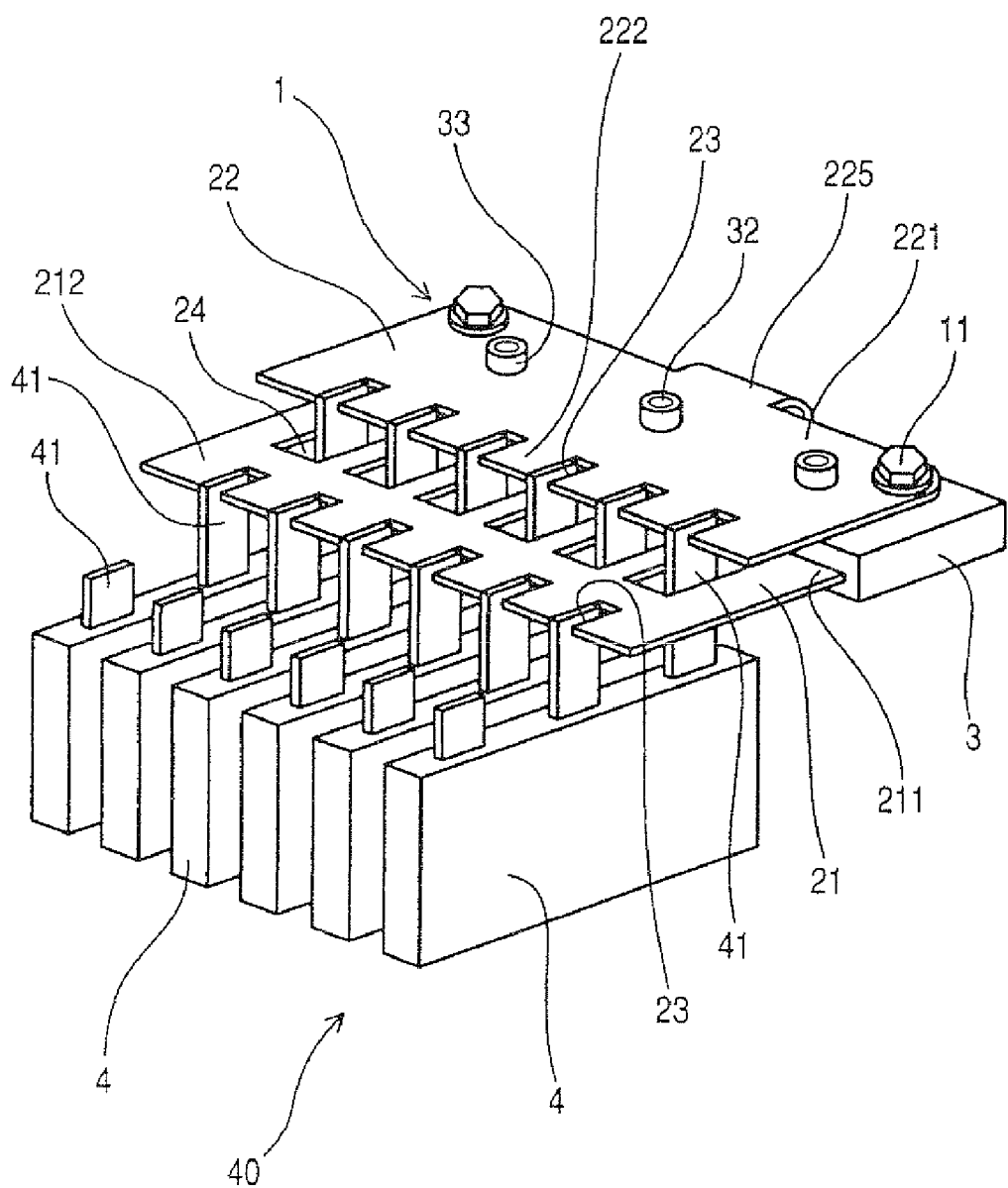
FIG. 5 is a perspective view of the bus bar assembly of FIG. 1 when joined to semiconductor modules of an electric power converter.

Referring to the drawings, wherein like reference numbers refer to like parts in several views, particularly to FIG. 5, there is shown a bus bar assembly 1 according to the present invention which may be employed to establish electric connections with a plurality of semiconductor modules installed in an electric power converter for use in electric vehicles or hybrid vehicles.

The bus bar assembly 1 includes a resin-molded body 3, a first bus bar 21, and a second bus bar 22. The first and second bus bars 21 and 22 are joined to main electrode terminals 41 of a plurality of semiconductor modules 4 installed in an electric power converter 40. Each of the semiconductor modules 4 is equipped with semiconductor devices. Each of the first and second bus bars 21 and 22 is made of a conductive flat plate.

Figure 1:
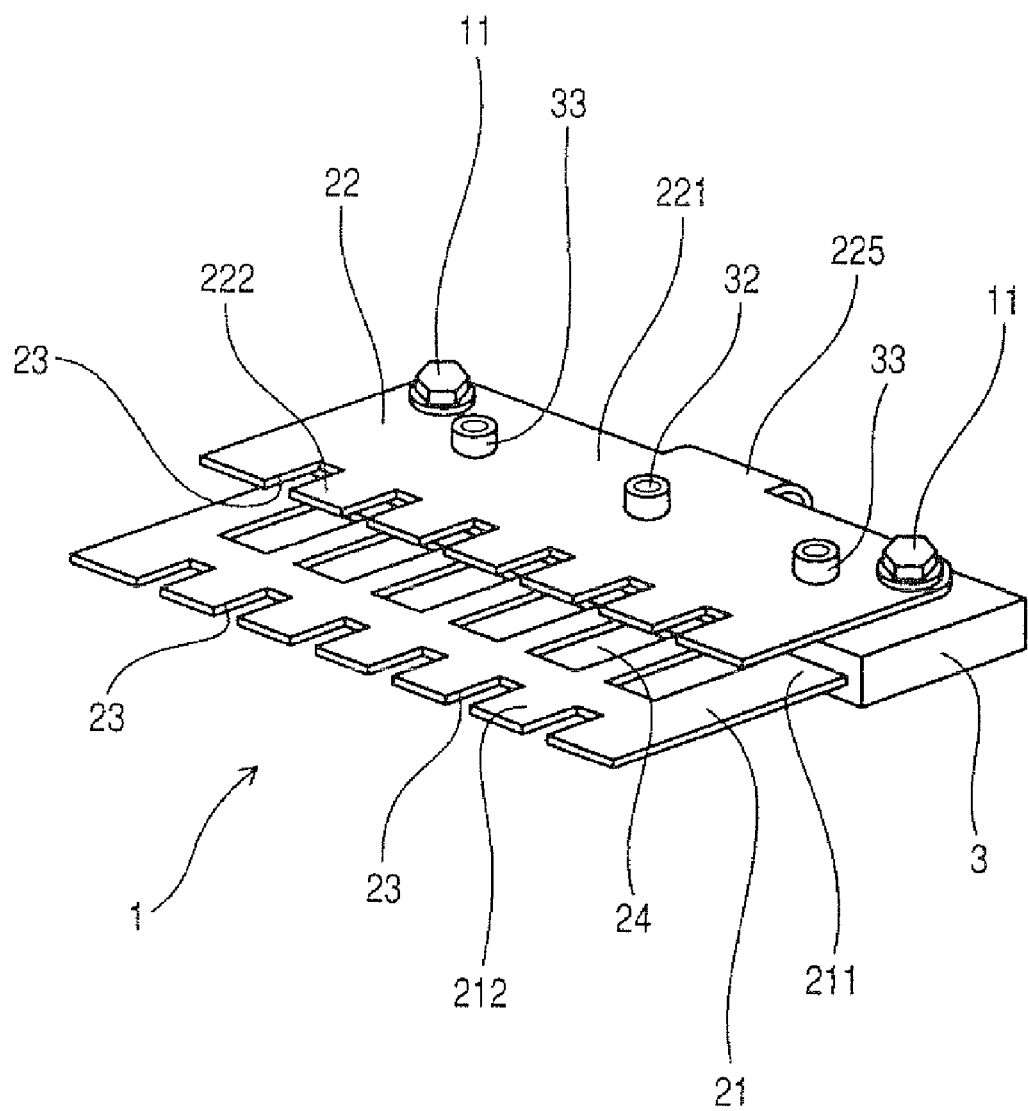
FIG. 1 is a perspective view which shows a bus bar assembly according to the present invention.
Figure 2:
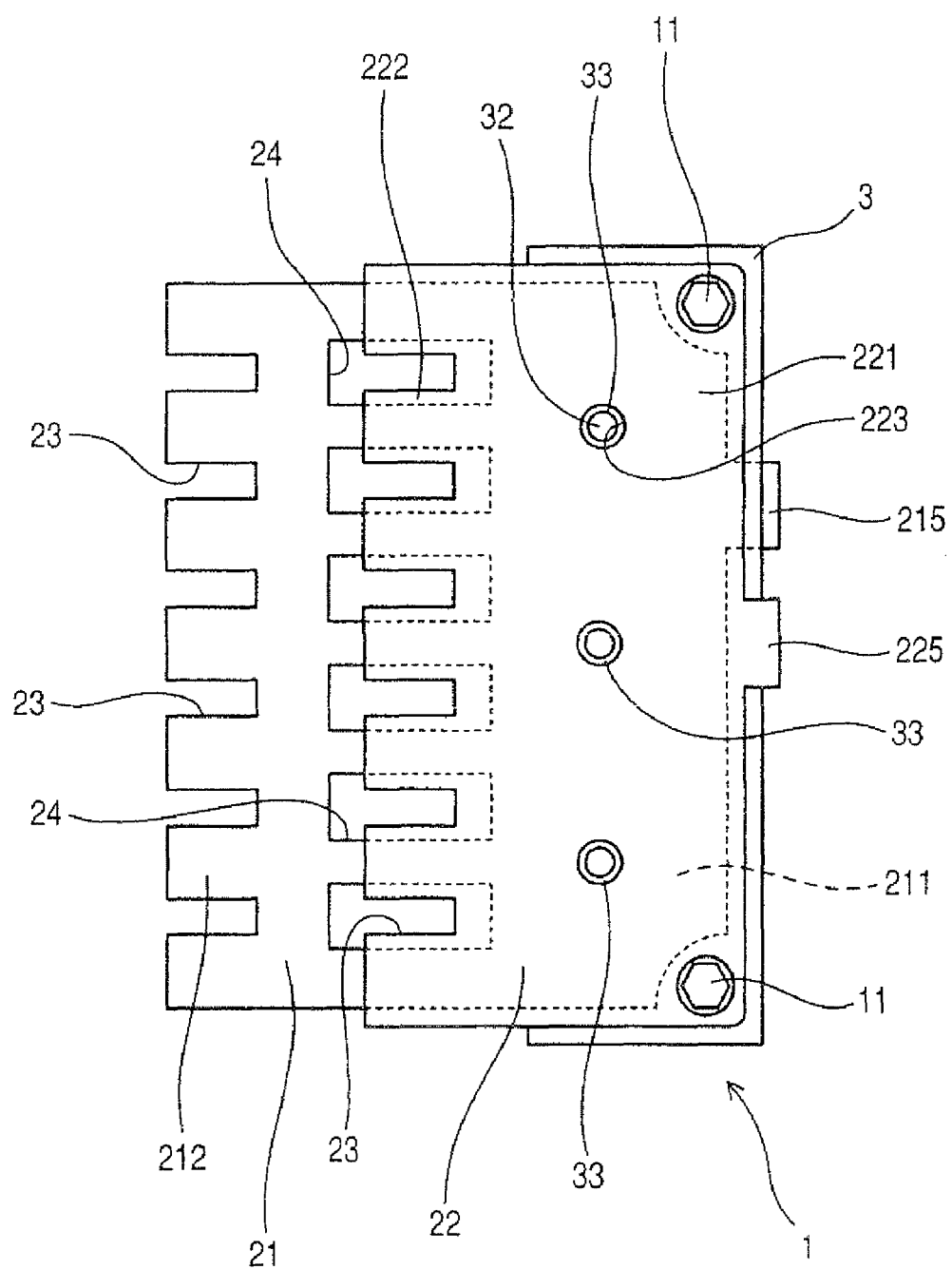
FIG. 2 is a top view of the bus bar assembly of FIG. 1.

The first bus bar 21, as shown in FIGS. 1, 2, and 5, consists of a plate body 211 and a plurality of connecting terminals 212 extending from the side of the plate body 211 in parallel to a major surface of the plate body 211. The connecting terminals 212 are used to connect with main electrode terminals 41, respectively. Similarly, the second bus bar 22 consists of a plate body 221 and a plurality of connecting terminals 222 extending from the side of the plate body 221 in parallel to a major surface of the plate body 221. The connecting terminals 222 are used to connect with main electrode terminals 41, respectively.

The first bus bar 21 has at least a portion insert-molded in the resinous body 3.

The second bus bar 22 is laid to overlap the first bus bar 21 at a given distance away from the first bus bar 21 and retained at the plate body 221 on the major surface of the resinous body 3.

The power converter 40 works to convert electric power between a dc power supply and an ac load. Specifically, the power converter 40 consists of the semiconductor modules 4 and cooling pipes (not shown) which are laid to overlap each other. The cooling pipes work to cool the semiconductor modules 4. Each of the semiconductor modules 4, as clearly illustrated in FIGS. 5 and 6, has the three main electrode terminals 41 extending in parallel to each other from one of side surfaces expanding perpendicular to opposed major surfaces thereof. One of the three main electrode terminals 41 of each of the semiconductor modules 4 is connected electrically to the first bus bar 21. One of the two remaining main electrode terminals 41 is connected electrically to the second bus bar 22. The remaining one of the electrode terminals 41 is connected electrically to an electrode of an ac load such as a three-phase ac electric rotating machine (not shown).

The first bus bar 21 is joined to a positive (+) terminal of the dc power supply, while the second bus bar 22 is joined to a negative (−) terminal of the dc power supply.

The first and second bus bars 21 and 22 are each made of a metal plate such as a copper plate. Each of the first and second bus bars 21 and 22 has, as clearly illustrated in FIGS. 2 and 4, a plurality of teeth 23 formed by cutting out a side portion thereof. The teeth 23 of the first and second bus bars 21 and 22 serve as the connecting terminals 212 and 222, respectively. The first bus bar 21 has formed therein a plurality of openings or windows 24 which are arrayed in a lengthwise direction thereof at regular intervals in spatial coincidence with the teeth 23 of the second bus bar 22. In other words, each of the teeth 23 is spatially coincident with one of the windows 24 in a thickness-wise direction of the first and second bus bars 21 and 22. The windows 24 are greater in size (i.e., width and length thereof) than the teeth 23.

Figure 6:
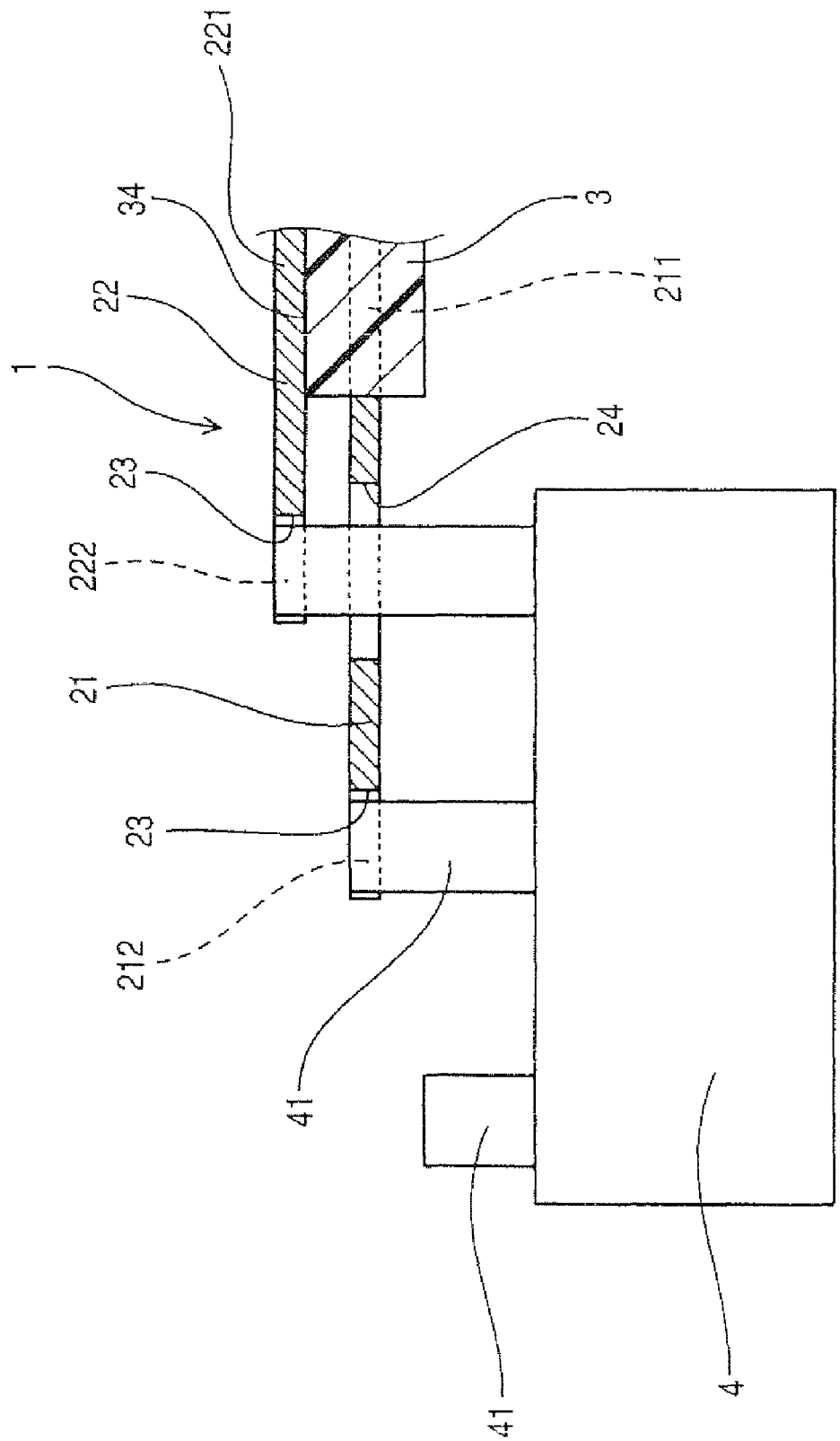
FIG. 6 is a partially sectional side view which illustrates joints between the bus bar assembly of FIG. 1 and semiconductor modules of an electric power converter.

Each of the main electrode terminals 41 of the semiconductor modules 4, as can be seen in FIGS. 5 and 6, extends through one of the windows 24 of the first bus bar 21 and connects with the second bus bar 22.

Figure 4:
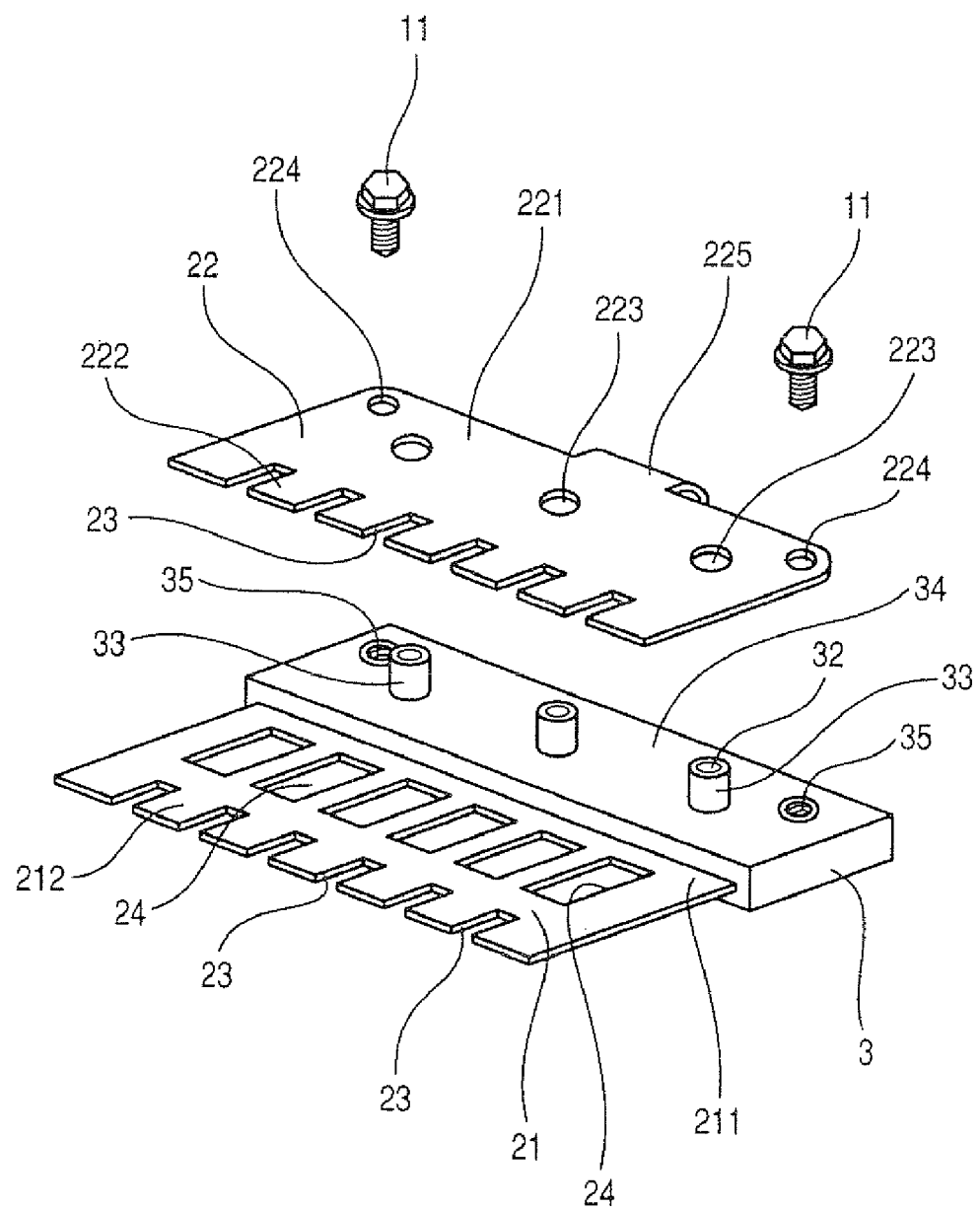
FIG. 4 is an exploded view of the bus bar assembly of FIG. 1.

The first and second bus bars 21 and 22 have, as illustrated in FIGS. 2, 4, and 5, terminals 215 and 225 which extend from the sides of the plate bodies 211 and 221 and connect with electric poles of a capacitor (not shown), respectively.

Figure 3:
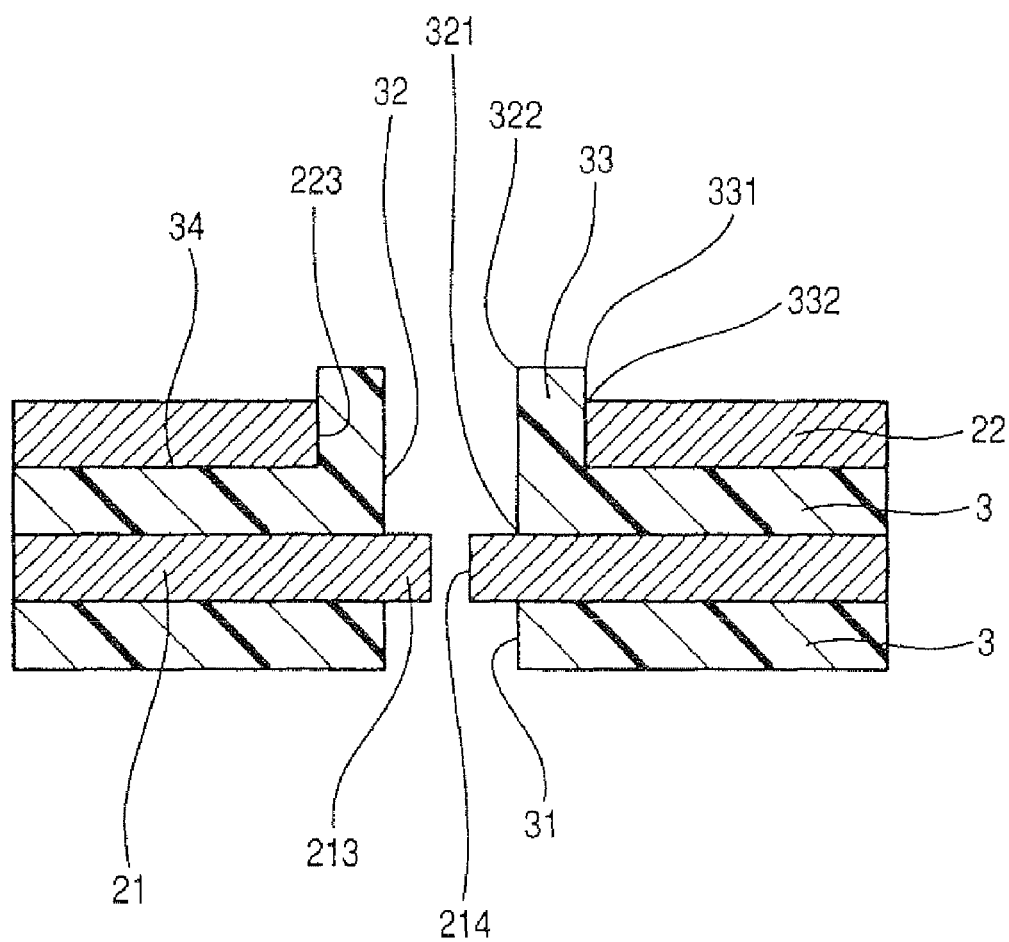
FIG. 3 is a transverse sectional view of the bus bar assembly of FIG. 1.

The resinous body 3, as illustrated in FIG. 3, has formed therein back openings 31 (only one is shown for the sake of simplicity) through which the back surface of the first bus bar 21 is exposed outside the resinous body 3 and front openings 32 (only one is shown for the same of simplicity) through which the front surface of the first bus bar 21 is exposed outside the resinous body 3. The back and front openings 31 and 32 lie in spatial coincidence with each other in the thickness-wise direction of the resinous body 3 (i.e., the first bus bar 21).

The resinous body 3, as shown in FIGS. 1 to 5, has formed thereon hollow cylindrical bosses 33 each of which extends around the perimeter of one of the front openings 32 above the second bus bar 22. In other words, the height of the bosses 33 is greater than the thickness of the second bus bar 22. Each of the bosses 33 is fit in one of positioning openings 223 formed in the second bus bar 22 to fix a given positional relation between the second bus bar 22 and the resinous body 3.

The first bus bar 21 has, as illustrated in FIG. 3, portions 213 each of which is exposed to the back and front openings 31 and 32. Each of the exposed portions 213 has formed therein a hole 214 which is smaller in diameter than the back and front openings 31 and 32.

The back openings 31, the front openings 32, and the small-diameter holes 214 are each defined by circular openings whose centers are aligned in the thickness-wise direction of the first bus bar 21. In other words, the back openings 31, the front openings 32, and the small-diameter holes 214 are disposed coaxially with each other in the thickness-wise direction of the resinous body 3. The back openings 31 and the front openings 32 have the same diameter.

The back openings 31, the front openings 32, and the bosses 33 are, as illustrated in FIGS. 1 and 2, formed in and on three places of the resinous body 3.

The resinous body 3, as illustrated in FIGS. 3 and 4, has a seating surface 34 extending parallel to the major surface of the first bus bar 21. The bosses 33 protrude from the seating surface 34.

The second bus bar 22 has the three positioning holes 223 which are so formed in the plate body 221 as to coincide with the bosses 33 of the resinous body 3, respectively. The plate body 221 of the second bus bar 22 is placed on the seating surface 34 of the resinous body 3 with the bosses 33 fit in the positioning holes 223. This fixes the positional relation of the second bus bar 22 to the resinous body 3 and the first bus bar 21.

The installation of the second bus bar 22 on the resinous body 3 in which the first bus bar 21 is insert-molded is achieved by inserting two bolts 11 into mounting holes 224 and tightening them into threaded holes 35 formed in corners of the seating surface 34 of the resinous body 3, thereby completing the bus bar assembly 1, as illustrated in FIG. 1

Figure 7:
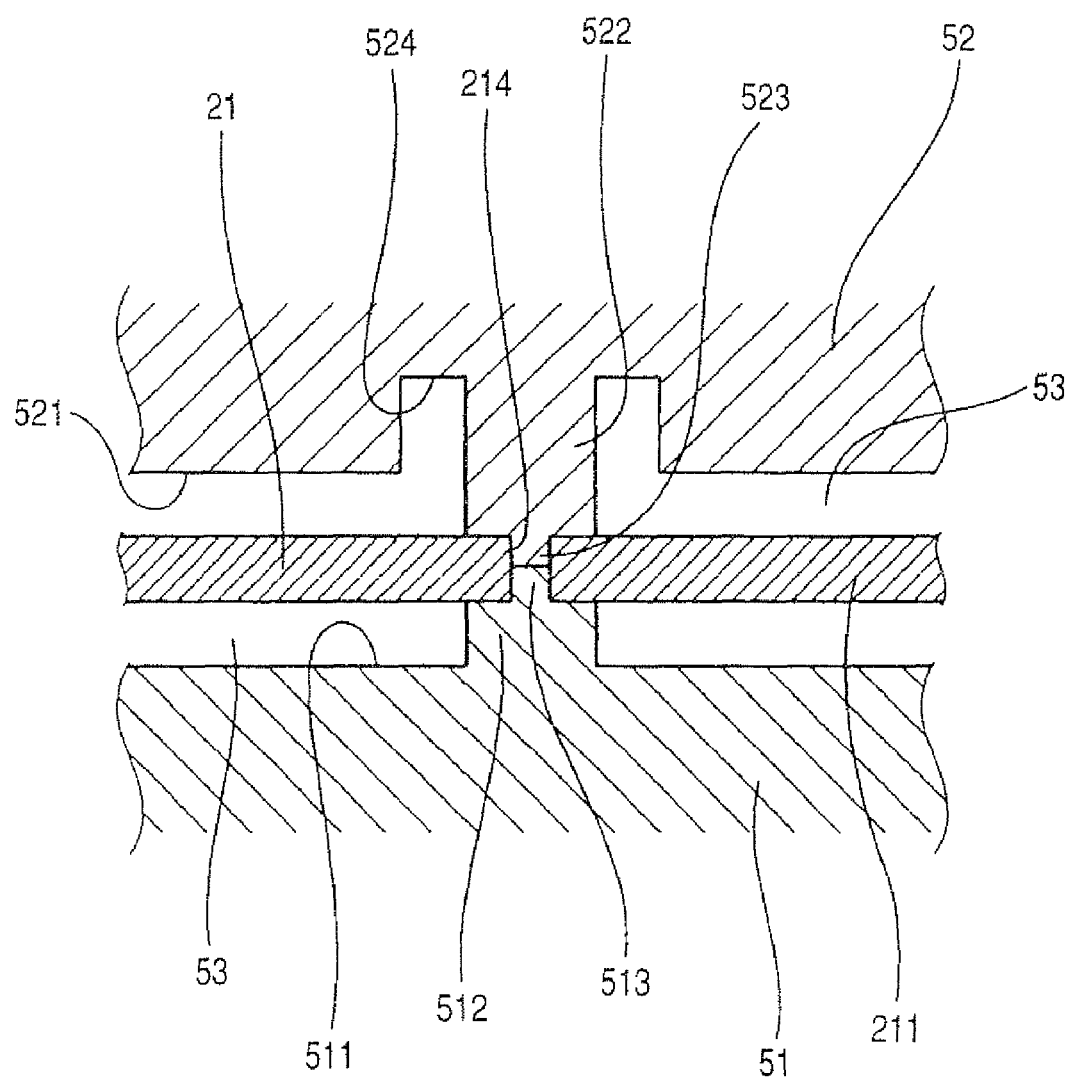
FIG. 7 is a partially transverse sectional view which shows a first bus bar retained in a mode to form a resinous body of the bus bar assembly of FIG. 1.
Figure 8:
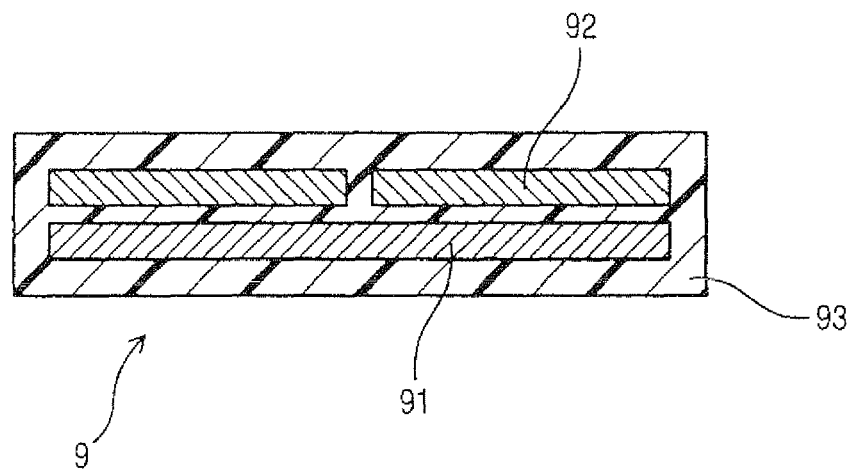
FIG. 8 is a transverse sectional view of a conventional bus bar assembly.
Figure 9:
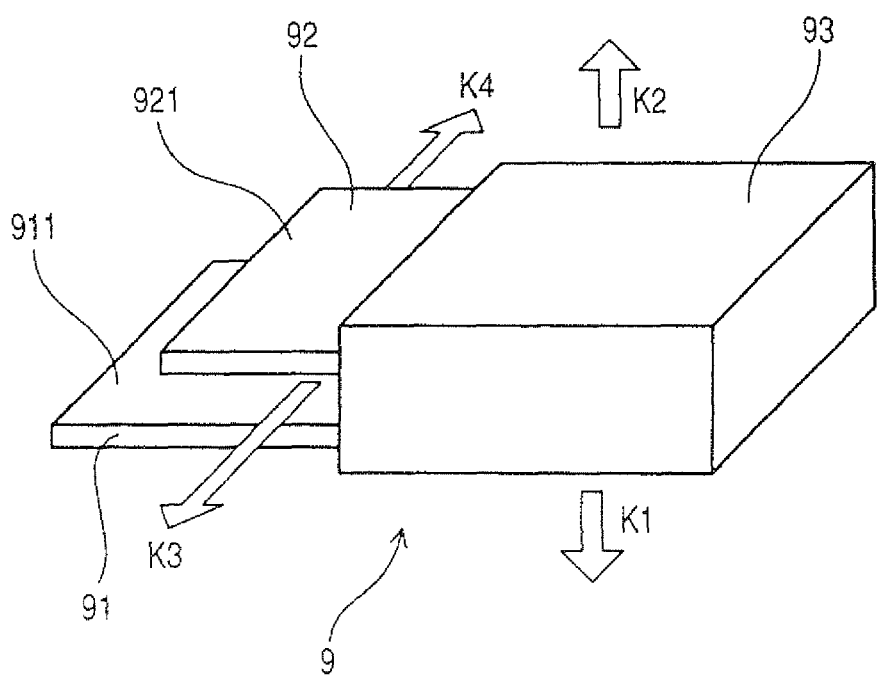
FIG. 9 is a perspective view which illustrates how to draw pieces of a mold to form the conventional bus bar assembly of FIG. 8.

The assembling of the resinous body 3 and the first bus bar 21 is, as illustrated in FIG. 7, accomplished by placing a portion of the plate body 211 of the first bus bar 21 in a forming mold made up of a lower block 51 and an upper block 52. The lower block 51 has supports 512 and lower protrusions 513 (only one is shown for the sake of simplicity). Each of the supports 512 extends from a cavity lower surface 511. Each of the lower protrusions 513 extends from an upper end of one of the supports 512. The upper block 52 has annular chambers 524 formed in a cavity upper surface 521, presser protrusions 522 extending from inside the chambers 524 to below the cavity upper surface 521, and upper protrusions 523 extending from lower ends of the presser protrusions 522.

The supports 512, the lower protrusions 513, the annular chambers 524, the presser protrusions 522, and the upper protrusions 523 are formed on or in three places of the lower block 51 or the upper block 52.

In the mold, the plate body 211 of the first bus bar 21 is retained by the supports 512 and pressed by the presser protrusions 522. Specifically, the plate body 211 of the first bus bar 21 is held firmly by the supports 512 and the presser protrusions 522 at three places between the upper and lower blocks 52 and 51, thereby fixing the position of the first bus bar 21 in the thickness-wise direction thereof.

The lower protrusions 513 and the upper protrusions 523 are fit in the small-diameter holes 214 of the first bus bar 21, thereby fixing the position of the major surfaces of the first bus bar 21 in a horizontal direction of the mold.

In the assembly, as illustrated in FIG. 7, a cavity 53 is defined by portions of the front and back surfaces and the circumference of the plate body 211 of the first bus bar 21 within the mold. Melted resin is charged into the cavity 53 to complete the resinous body 3 in which a portion of the first bus bar 21 is disposed hermetically. The resin charged in the annular chambers 524 in the upper block 52 forms the bosses 33.

The above described structure of the bus bar assembly 1 offers the following advantages.

The second bus bar 22 is not insert-molded with the resinous body 3. In other words, only the first bus bar 21 is, as can be seen in FIG. 7, insert-molded with the resinous body 3, thus eliminating the need for retaining both the first and second bus bars 21 and 22 in the mold when the resinous body 3 is formed. This minimizes the misalignment between the first and second bus bars 21 and 22 in the bus bar assembly 1. The desired positional relation between the first and second bus bars 21 and 22 is, therefore, established only by holding the first bus bar 21 in place within the mold.

The bus bar assembly 1 is, as described above, designed to be built up by insert-molding the first bus bar 21 with the resinous body 3 and then joining the second bus bar 22 to the resinous body 3, thus facilitating the ease of completing the resinous body 3. In other words, the resinous body 3 is easy to mold by using only the two blocks 51 and 52 and complete by drawing the blocks 51 and 52 in vertical opposite directions, as viewed in FIG. 7. The second bus bar 22 is not disposed inside the resinous body 3 and, as illustrated in FIGS. 1 to 3, has one of the major surfaces exposed to the air as a whole, thus enhancing the dissipation of heat from the bus bar assembly 1.

Only the first bus bar 21 is insert-molded with the resinous body 3, thus resulting in a decrease in material used to mold the resinous body 3, which leads to a decrease in overall production cost of the bus bar assembly 1.

The resinous body 3, as already referred to in FIG. 3, has the back openings 31 and the front openings 32 and the bosses 33 which are formed around the front openings 32 and fit in the positioning holes 223 formed in the second bus bar 22, thus ensuring the stability in holding the first bus bar 21 in the mold when the resinous body 3 is formed. The holding of the first bus bar 21 is achieved, as illustrated in FIG. 7, by aligning the supports 512 and the presser protrusions 522 used to form the front and back openings 32 and 31 and nipping the first bus bar 21 firmly.

The bosses 33 are also used to position the second bus bar 22 relative to the resinous body, thereby ensuring the desired orientation of the first and second bus bars 21 and 22 to each other.

The formation of the front openings 32 results in concern about a decrease in resistance of insulation between the first and second bus bars 21 and 22, but however, the bosses 33 lying around the front openings 32 lengthen the distance (i.e., the creepage distance) between the first and second bus bars 21 and 22 along the surface of the resinous body 3, thereby ensuring the desired resistance of insulation between the first and second bus bars 21 and 22. Note that the creepage distance is, as can be seen in FIG. 3, the distance from the lower edge 321 of the front opening 32 to the upper edge 322 of the front opening 32, to the outer upper edge 331 of the boss 33, and to a contact 332 between the outer peripheral wall of the boss 33 and the end of the second bus bar 22.

As apparent from the above, a combination of one of the back openings 31, one of the front openings 32, and the one of the bosses 33 functions 1) to retain the first bus bar 21 when the resinous body 3 is molded, 2) to position the second bus bar 22 relative to the resinous body 3, and 3) to ensure a required value of the creepage distance between the first and second bus bars 21 and 22, thus resulting in a simplified structure of the bus bar assembly 1.

The portion 213 of the first bus bar 21 exposed to one of the back openings 31 and one of the front openings 32 has, as illustrated in FIG. 7, the small-diameter hole 214. When the resinous body 3 is formed, the first bus bar 21 is nipped at the front and back surfaces thereof through the small-diameter holes 214 by the supports 512 and the presser protrusions 522 of the lower and upper blocks 51 and 52 of the mold. Additionally, each of the lower protrusions 513 and a corresponding one of the upper protrusions 523 abut each other directly. This fixes the orientation of the first bus bar 21 in a direction (i.e., the horizontal direction in FIG. 7) parallel to the major surfaces thereof as well as in the thickness-wise direction (i.e., the vertical direction in FIG. 7) in the mold.

The back openings 31, the front openings 32, and the bosses 33 are, as described above, formed in and on a plurality of portions of the resinous body 3, thereby increasing the accuracy in positioning the first bus bar 21 in the mold when the resinous body 3 is formed and also positioning the second bus bar 22 relative to the first bus bar 21 in the bus bar assembly 1.

As described above, the bus bar assembly 1 is designed to ensure the positional relation between the first and second bus bars 21 and 22, have increased ability of heat dissipation, and be manufactured in a simple way at low costs.

While the present invention has been disclosed in terms of the preferred embodiment in order to facilitate better understanding thereof, it should be appreciated that the invention can be embodied in various ways without departing from the principle of the invention. Therefore, the invention should be understood to include all possible modifications to the shown embodiment which can be embodied without departing from the principle of the invention as set forth in the appended claims.

What is claimed is:

1. A bus bar assembly comprising:
   a resinous body;
   a first bus bar to which electrode terminals of semiconductor modules of an electric power converter are to be connected electrically, said first bus bar being made of a conductive plate which includes a plate body and a plurality of connecting terminals extending from the plate body substantially in parallel to a major surface of the plate body to establish electric connections with the electrode terminals of the semiconductor modules, at least a portion of the body plate of said first bus bar being disposed inside said resinous body, said resinous body having an exterior seat surface that extends in parallel to the major surface of the plate body of the first bus bar; and
   a second bus bar to which electrode terminals of the semiconductor modules of the electric power converter are to be connected electrically, said second bus bar being made of a conductive plate which includes a plate body and a plurality of connecting terminals extending from the plate body substantially in parallel to a major surface of the plate body to establish electric connections with the electrode terminals of the semiconductor modules, the plate body of said second bus bar being seated on and fixed to said exterior seat surface of said resinous body so that said second bus bar extends in parallel to said first bus bar at a given distance spaced away from said first bus bar.

2. A bus bar assembly as set forth in claim 1, wherein said resinous body has formed therein a front opening through which a portion of a front surface of the plate body of said first bus bar is exposed outside said resinous body and a back opening through which a portion of a back surface of the plate body of said first bus bar is exposed outside said resinous body, the front and back openings being aligned in a thickness-wise direction of said resinous body, said resinous body also having formed thereon a boss extending from said exterior seat surface of said resinous body around the front opening, and wherein said second bus bar has a positioning opening in which the boss is fit to fix a positional relation of said second bus bar relative to said resinous body.

3. A bus bar assembly as set forth in claim 2, wherein said first bus bar has a hole formed to extend through the portions of the front surface and the back surface of the plate body of said first bus bar exposed through the front and back openings, the hole being smaller in diameter than the front and back openings.

4. A bus bar assembly as set forth in claim 2, wherein said resinous body also has formed therein a second front opening through which a portion of the front surface of the plate body of said first bus bar is exposed outside said resinous body and a second back opening through which a portion of the back surface of the plate body of said first bus bar is exposed outside said resinous body, the second front and back openings being aligned in the thickness-wise direction of said resinous body, said resinous body also having formed thereon a second boss extending from the exterior seat, surface of said resinous body around the second front opening, and wherein said second bus bar has a second positioning opening in which the second boss is fit to fix the positional relation of said second bus bar relative to said resinous body.

5. A bus bar assembly as set forth in claim 2, wherein the boss has a height in the thickness-wise direction of said resinous body that is greater than a thickness of the second bus bar.

6. A bus bar assembly comprising:
   a resinous body;
   a first bus bar to which electrode terminals of semiconductor modules of an electric power converter are to be connected electrically, said first bus bar being made of a conductive plate which includes a plate body and a plurality of connecting terminals extending from the plate body substantially in parallel to a major surface of the plate body to establish electric connections with the electrode terminals of the semiconductor modules, at least a portion of the body plate of said first bus bar being disposed inside said resinous body; and
   a second bus bar to which electrode terminals of the semiconductor modules of the electric power converter are to be connected electrically, said second bus bar being made of a conductive plate which includes a plate body and a plurality of connecting terminals extending from the plate body substantially in parallel to a major surface of the plate body to establish electric connections with the electrode terminals of the semiconductor modules, said second bus bar being mounted at the plate body on said resinous body and laid to overlap said first bus bar at a given distance away from said first bus bar, wherein said resinous body has formed therein a front opening through which a portion of a front surface of the plate body of said first bus bar is exposed outside said resinous body and a back opening through which a portion of a back surface of the plate body of said first bus bar is exposed outside said resinous body, the front and back openings being aligned in a thickness-wise direction of said resinous body, said resinous body also having formed thereon a boss extending from a major surface of said resinous body around the front opening, and wherein said second bus bar has a positioning opening in which the boss is fit to fix a positional relation of said second bus bar relative to said resinous body.

7. A bus bar assembly as set forth in claim 6, wherein said first bus bar has a hole formed to extend through the portions of the front surface and the back surface of the plate body of said first bus bar exposed through the front and back openings, the hole being smaller in diameter than the front and back openings.

8. A bus bar assembly as set forth in claim 6, wherein said resinous body also has formed therein a second front opening through which a portion of the front surface of the plate body of said first bus bar is exposed outside said resinous body and a second back opening through which a portion of the back surface of the plate body of said first bus bar is exposed outside said resinous body, the second front and back openings being aligned in the thickness-wise direction of said resinous body, said resinous body also having formed thereon a second boss extending from the major surface of said resinous body around the second front opening, and wherein said second bus bar has a second positioning opening in which the second boss is fit to fix the positional relation of said second bus bar relative to said resinous body.

9. A bus bar assembly as set forth in claim 6, wherein the boss extends above a thickness of the second bus bar.

* * * * *